(12) United States Patent
Shaw

(10) Patent No.: US 7,699,564 B2
(45) Date of Patent: Apr. 20, 2010

(54) SELF-CONTAINED KEYHOLD WELD FITTING AND METHOD OF USE

(75) Inventor: Brian S. Shaw, Broken Arrow, OK (US)

(73) Assignee: TDW Delaware, Inc., Wilmington, DE (US)

( * ) Notice: Subject to any disclaimer, the term of this patent is extended or adjusted under 35 U.S.C. 154(b) by 393 days.

(21) Appl. No.: 11/743,484

(22) Filed: May 2, 2007

(65) Prior Publication Data

US 2008/0272592 A1 Nov. 6, 2008

(51) Int. Cl.
*F16L 41/08* (2006.01)
(52) U.S. Cl. ............... 405/184.1; 405/184.4; 138/97
(58) Field of Classification Search .......... 405/184.1, 405/184.3, 184.4, 156; 138/97–99
See application file for complete search history.

(56) References Cited

U.S. PATENT DOCUMENTS

| 847,594 | A | | 3/1907 | McCreary |
|---|---|---|---|---|
| 3,178,973 | A | | 4/1965 | Rosengarten, Jr. et al. |
| 3,558,845 | A | | 1/1971 | Norcross |
| 3,578,233 | A | | 5/1971 | Meister et al. |
| 3,784,778 | A | | 1/1974 | McPherson et al. |
| 4,130,925 | A | * | 12/1978 | Gibson ............... 405/174 |
| 4,323,526 | A | | 4/1982 | Hilbush, III |
| 4,610,439 | A | | 9/1986 | Burghardt |
| 4,647,073 | A | | 3/1987 | Kosaka |
| 4,684,789 | A | | 8/1987 | Eggleston |
| 4,832,069 | A | | 5/1989 | Gale et al. |
| 5,659,935 | A | | 8/1997 | Lo-Pinto et al. |
| 6,142,165 | A | | 11/2000 | Wartel et al. |
| 6,669,406 | B2 | | 12/2003 | Hutton et al. |
| 6,705,801 | B1 | | 3/2004 | Kiest, Jr. |
| 7,001,106 | B2 | | 2/2006 | Burnham et al. |
| 7,172,369 | B2 | * | 2/2007 | Crabtree et al. ........ 405/184.1 |
| 2006/0002765 | A1 | | 1/2006 | Hutton et al. |
| 2006/0027627 | A1 | | 2/2006 | Garrison et al. |
| 2006/0182500 | A1 | * | 8/2006 | Crabtree et al. ........ 405/184.1 |

OTHER PUBLICATIONS

International Search Report and Written Opinion; dated Aug. 14, 2008; issued by International Searching Authority ISA/US; 11 pages.

* cited by examiner

*Primary Examiner*—Frederick L Lagman
(74) *Attorney, Agent, or Firm*—Gable Gotwals

(57) ABSTRACT

A method of attaching a branch outlet fitting to a metal pipe buried beneath the earth's surface while causing reduced disturbance to the earth above the pipe, comprising digging a vertical excavation from the earth's surface to expose a short length of the pipe; positioning a first fitting portion on a lower surface of the pipe; positioning a second fitting portion on an upper surface of the pipe in alignment with the first fitting portion, the first and second fitting portions having welding material thereon adjacent the pipe surfaces and each other; and from the earth's surface, activating the welding material to physically and sealably secure the fitting portions to the pipe and to each other.

10 Claims, 2 Drawing Sheets

SELF-CONTAINED KEYHOLD WELD FITTING AND METHOD OF USE

REFERENCE TO PENDING APPLICATIONS

This application is not based upon any pending domestic or international patent applications.

FIELD OF THE INVENTION

The present invention is generally directed toward a method for attaching a self-contained keyhole weld fitting and apparatus. More specifically, the present invention provides an improved fitting and method of use providing a branch outlet which can be physically and sealably secured to an underground pipe while causing less disturbance to the earth above the pipe than using a traditional fitting and excavation.

BACKGROUND OF THE INVENTION

Additional outlets must often be added to underground pipelines or pipes. This is typically accomplished by creating an excavation from the earth's surface down to the pipe to be tapped. In locations where disturbance of the surface is not an issue an excavation is made which exposes the underground pipe and is large enough to accommodate a fitting along with a welder and his equipment. The fitting is temporarily held in place by various means while the welder physically and sealably secures the fitting by welding it to the exterior of the pipe. Once the fitting has been welded in place the means by which the fitting is temporarily held in place are removed. At this point an operation called a hot tap is carried out wherein a portion of the pipe is cut and removed such that the fitting is now in fluid communication with the interior of the pipe. This is accomplished while the pipe is under pressure carrying gas or liquids.

In many situations, such as pipes located under busy city streets, the surface disturbance caused by an excavation large enough to accommodate the fitting and welder are unacceptable. In these types of situations a much smaller excavation is created extending from the earth's surface down to just below the underground pipe being tapped. The excavation is deep enough to expose the lower surface of the pipe. The diameter of the excavation is typically just large enough to accommodate the fittings to be mounted on the pipe. A first portion of the fitting is seated on the lower surface of the pipe. The second portion of the fitting is then placed on a top portion of the pipe. The first and second portions are aligned with one another and secured to one another and the pipe using bolts. These bolt-on fittings are sealed to the pipe by elastomeric seals captured between the fitting and pipe. While these bolt-on fittings allow an underground pipe to be tapped with minimal disturbance to the surface, the elastomeric seals tend to deteriorate over time leading to leaks between the pipe and the fitting.

There is a long felt need in the pipeline industry for a fitting and method which would provide a permanent welded seal for a branch outlet while accessing the existing pipe using a keyhole excavation.

For additional information relating to excavation and fittings for tapping underground pipes, reference may be had to the following previously issued United States patents.

| U.S. Pat. No. | Inventor | Title |
|---|---|---|
| 847,594 | McCreary | Hose or Pipe Mender |
| 3,178,793 | Rosengarten Jr. et al. | Apparatus For Sealing Mains |
| 4,323,526 | Hilbush III | Method For Sealing Pipe Joints |
| 4,610,439 | Burghardt | Service Saddle U-Bolt Installation Holder |
| 4,647,073 | Kosaka | Clamping Device For Underground Pipes |
| 4,832,069 | Gale et al. | Tapping Subterranean Pipes |
| 5,659,935 | Lo-Pinto et al. | Apparatus For Installing A Branch Tapping On A Pipe |
| 6,142,165 | Wartel et al. | Method and Apparatus For Installing A Branch Connector From The Top Of An Excavation |
| 6,669,406 | Hutton et al. | Method and Apparatus For Underground Connection of Pipe |
| 6,705,801 | Kiest Jr. | Apparatus and Method For Providing Access To Buried Pipeline |
| 7,001,106 | Burnham et al. | Installation of Service Connections For Sensors or Transmitters In Buried Water Pipes |
| 2006/0002765 | Hutton et al. | Tool Assembly With Universal Coupling For Various Tools, For Work On Underground Pipes |

BRIEF SUMMARY OF THE INVENTION

The present invention satisfies the needs discussed above. The present invention is generally directed toward a fitting and method of use which allows for tapping an underground pipe through a keyhole excavation which creates a minimum amount of disturbance to the earth's surface while also providing a welded connection and seal between the fitting and the pipe.

The fitting of the present invention uses a weld material which is placed between the fitting and the pipe. This weld material can then be activated from the earth's surface by applying an electrical charge across the fitting, weld material and pipe. The method for using the apparatus is to dig a keyhole excavation from the earth's surface to a depth sufficient to expose the pipe being tapped. The fitting is then placed on the pipe with the weld material captured between the fitting and the pipe. A power lead is attached to the fitting and a ground lead is attached to the pipe. An electrical charge is then applied to the power lead. This charge goes through the fitting, weld material and pipe and into the ground lead. Once the weld material has been activated it physically and sealably holds the fitting in place.

Further objects and features of the present invention will be apparent to those skilled in the art upon reference to the accompanying drawings and upon reading the following description of the preferred embodiments.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENTS

For explaining the present invention in detail it is to be understood that the invention is not limited in its application to the details of the construction and arrangement of the parts illustrated in the accompanying drawings. The invention is capable of other embodiments and of being practiced or carried out in a variety of ways. It is to be understood that the phraseology and terminology employed herein are for the purpose of description and not of limitation.

Elements shown by the drawings are identified by the following numbers:

| | |
|---|---|
| 20 | Prior art fitting |
| 22 | Branch fitting |
| 24 | Pipe |
| 26 | First portion |
| 28 | Second portion |
| 30 | Bolts |
| 32 | Elastomeric seals |
| 34 | Keyhole excavation |
| 36 | Surface of earth |
| 50 | Fitting |
| 52 | Branch fitting |
| 54 | Pipe |
| 56 | First portion |
| 58 | Second portion |
| 60 | Weld material |
| 62 | Keyhole excavation |
| 64 | Excavation depth |
| 66 | Bottom (of excavation) |
| 68 | Top (of excavation) |
| 70 | Length of fitting |
| 72 | Insulators |
| 74 | Power lead |
| 76 | Hole |
| 78 | Ground lead |
| 80 | Plug |
| 82 | Hole |
| 84 | Earth's surface |
| 90 | Fitting |
| 92 | Tubular portion |
| 94 | Saddle-shaped contour cut |
| 96 | Weld material |
| 98 | Plug |
| 100 | Pipe |

Figure 1:
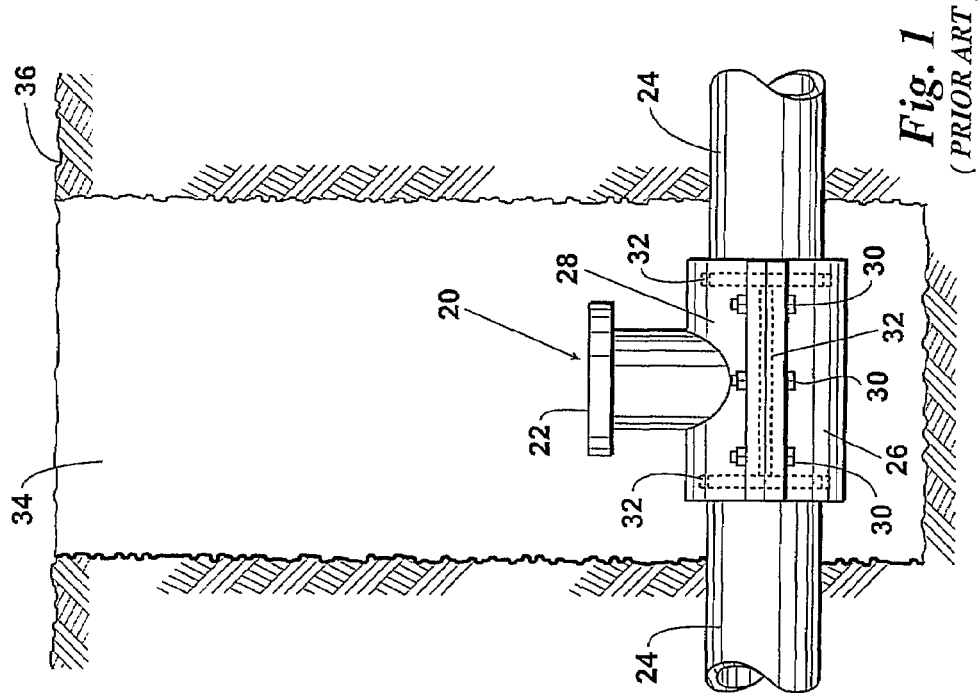
FIG. 1 is a cross-sectional view of an excavation showing the prior art fitting in place on an underground pipe.

Referring to FIG. 1, a prior art fitting 20 is used for attaching a branch outlet 22 to an underground pipeline or pipe 24. The prior art fitting 20 has a first portion 26 and a second portion 28 held together by a plurality of bolts 30. The second portion 28 also has a branch outlet 22. The elastomeric seals 32 are located on the underside of the first and second portions 26, 28 of the prior art fitting 20 and are shown in dashed lines.

In using the prior art fitting 20, a keyhole excavation 34 is dug from the surface of the earth 36 exposing the pipe 24. The size of the excavation 34 is depending upon the size of pipe 24 being tapped and to a certain extent, the depth of the pipe 24. The excavation 34 must be deep enough to expose the bottom side of the pipe 24 so the first portion 26 of the fitting 20 can be placed underneath the pipe 24. The second portion 28 of the fitting 20 is then placed on the top of the pipe 24. A plurality of bolts 30 are used to secure the first and second portions 26 and 28 to one another. As the bolts 30 are tightened, the elastomeric seals 32 are compressed between the underside of the first and second portions 26 and 28 of the fitting 20 and the pipe 24. This provides a seal between the first and second portions 26 and 28 of the fitting 20 and the pipe 24. Once the fitting 20 is securely in place on the pipe 24, the pipe 24 can be hot tapped so that a second pipe can be attached to the branch fitting 22 and provide an outlet for the gas or liquid flowing through the pipe 24.

Figure 2:
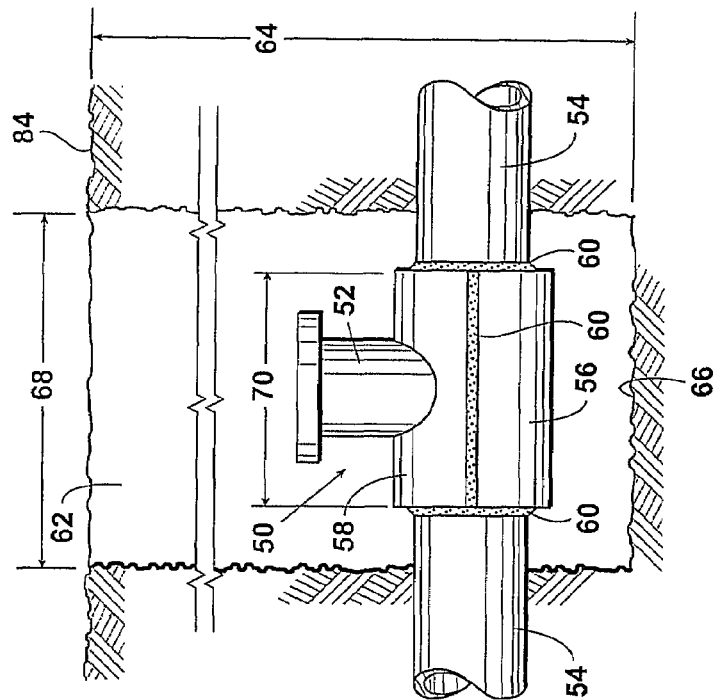
FIG. 2 is a cross-sectional view of an excavation showing an embodiment of the fitting of the present invention in place on an underground pipe.

Turning to FIG. 2, the fitting 50 of the present invention provides a branch fitting 52 for tapping into a pipe 54. The fitting 50 also has a first portion 56 and a second portion 58. The first and second portions 56 and 58 are secured and sealed to one another and to the pipe 54 by weld material 60. The fitting 50 and pipe 54 are shown at the bottom of a keyhole excavation 62. The depth 64 of the excavation 62 is dependent upon the depth of the pipe 54. For the embodiment shown in FIG. 2, the excavation 62 must be sufficiently deep to provide enough clearance between the pipe 54 and the bottom of the excavation 66 to allow for the first portion 56 of the fitting 50 to be placed on the pipe 54. The width 68 of the excavation 62 is dependent upon the length 70 of the fitting 50. The length 70 of the fitting 50 in turn is a function of the diameter of the pipe 54.

Figure 3:
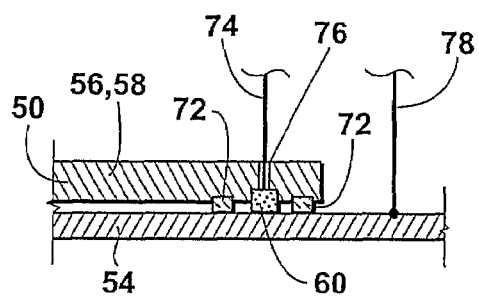
FIG. 3 is a cross-sectional view illustrating one embodiment of the layout of the insulators, weld material and fittings on a pipe.
Figure 4:
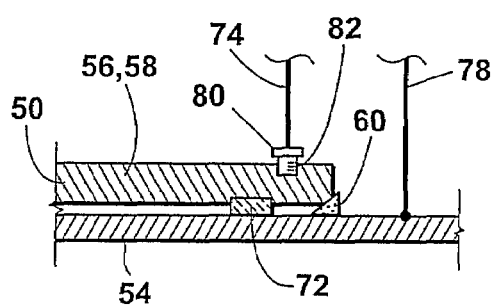
FIG. 4 is a second embodiment of the layout of the insulators and weld material between the fitting and pipe.

FIGS. 3 and 4 show two variations of the detail of the weld material 60 once it is put in place. Turning now to FIG. 3, the weld material 60 is disposed along the edges of the fitting 50. Insulators 72 electrically isolate the fitting 50 from the pipe 54. A power lead 74 passes through a hole 76 in the fitting 50 and is attached to the weld material 60. A ground lead 78 is attached to the pipe 54.

Turning now to FIG. 4 which shows another embodiment of the detailed joint layout used with the present invention. Here again the fitting 50 and the pipe 54 are electrically isolated from one another by insulators 72. The weld material 60 extends along the outer edge of the fitting 50 with a triangular cross-section. The power lead 74 is attached to a plug 80 which is then secured to a hole 82 in the fitting 50. The ground lead 78 is attached to the pipe 54.

The method of the present invention involves digging a keyhole excavation 62 extending from the earth's surface 84 to an excavation depth 64 to expose a pipe 54. The depth 64 of the excavation 62 should be sufficient to provide clearance between the bottom 66 of the excavation 62 and the pipe 54. The diameter 68 of the excavation should be sufficient to expose enough of the pipe 54 to secure the fitting 50. The first portion 56 of the fitting 50 is positioned on a lower surface of the pipe 54. The second portion 56 of the fitting 50 is positioned on an upper surface of the pipe 54 in alignment with the first portion 56. Welding material 60 is disposed along the edges of the first and second portion 56 and 58 of the fitting 50 such that it is between the fitting 50 and the pipe 54. If necessary, one or more insulators 72 can be used to provide proper spacing between the portions 56 and 58 of the fitting 50 and the pipe 54.

A power lead 74 is electrically connected to the fitting 50 and in turn the weld material 60. This can be accomplished in several ways included, but not limited to, attaching the power lead 74 through a hole 76 in the fitting 50 and attaching it directly to the weld material 60. This can also be accomplished by attaching the power lead 74 to a plug 80 which is seated in a hole 82 in the fitting 50. A ground lead 78 is attached to the pipe 54. The portions 56 and 58 of the fitting 50 is then physically and sealably secured to one another and the pipe 54 by passing an electrical charge through the power lead 74 into the weld material 60 through the pipe 54 and back to the ground lead 78. The control of the electrical current being done from the surface of the earth 84. The electrical charge melts the weld material 60 causing it to bond with the fitting 50 and the pipe 54. Once the fitting 50 has been welded to the pipe 54, the power lead 74 and ground lead 78 can be removed from the fitting 50 and pipe 54. The pipe 54 and fitting 50 are then ready to be hot tapped. The hot tap operation from this point on is carried out in the same manner that is commonly practiced in the art today.

The actual joining of the fitting 50 and the pipe 54 can be accomplished by any one of several welding or braising techniques, including by way of example, shielded metal arc welding, exothermic brazing, thermit welding, electro slag welding and explosive welding. The composition of the weld material 60 can adapted to carry out these different types of welding.

For the shielded metal arc welding process the weld material 60 shown in the drawings would be similar to the composition of a welding rod. The arc would be initially struck on one point along the path of the weld material 60. The arc would advance along the path of weld material melting the metal in the weld material 60 and releasing an inert shielding gas until the entire length of weld material 60 had been activated. The melted metal would fuse the fitting 50 and the pipe 54 together. Likewise the weld material 60 could also be a composition that would allow for exothermic brazing, thermit welding, electro slag welding or explosive welding.

Figure 5:
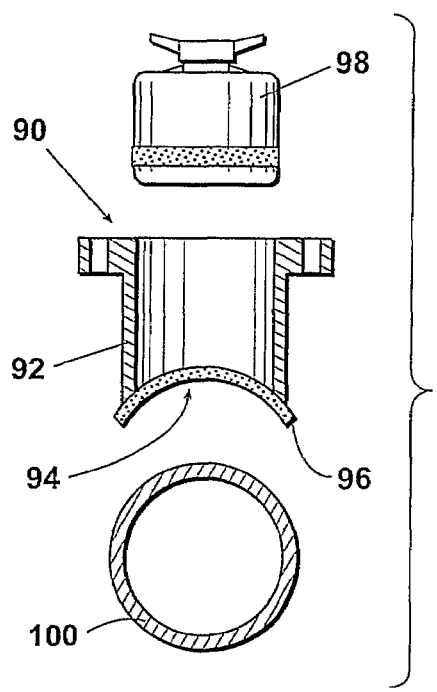
FIG. 5 is an exploded cross-sectional view of a second embodiment of the fitting of the present invention.
Figure 6:
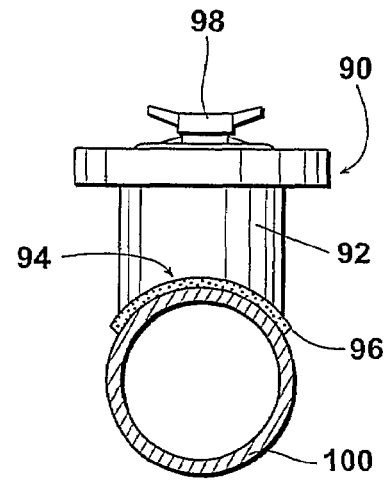
FIG. 6 is an end view of a second embodiment of the present invention mounted on a pipe.
Figure 7:
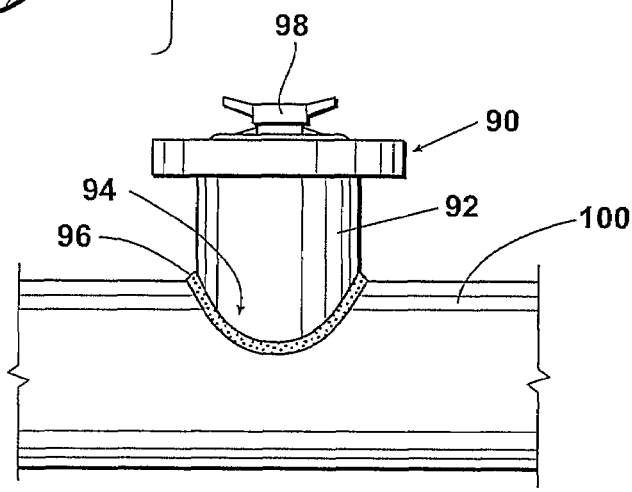
FIG. 7 is a side view of a second embodiment of the fitting of the present invention mounted on a pipe.

FIGS. 5, 6 and 7 show another embodiment of the apparatus of the present invention. The fitting 90 has a tubular portion 92 which terminates on one end with a saddle-shaped contour cut 94. The contour cut 94 is configured to fit the external surface of a short length of exposed pipe 100. Weld material 96 extends along the saddle-shaped contour cut 94. The fitting 90 can also have a removable plug 98 sized to fit inside the tubular portion 92 of the fitting 90.

In using this second embodiment of the fitting 90, it is only necessary to dig an excavation to a depth which exposes the upper surface of the pipe 100 sufficient to position the saddle-shaped contour cut 94 on the pipe 100. Then in a manner similar to that discussed for the first embodiment of the fitting 50 as shown in FIGS. 2 through 4, a power lead is attached either to the fitting 90 or directly to the weld material 96. A ground lead 78 is attached to the pipe 100. Prior to activating the weld material 96 using an electrical charge, the plug 98 is placed in the interior of the tubular portion 92 of the fitting 90. The plug 98 prevents weld material 96 from flowing into the interior of the tubular portion 92.

With the plug 98 in place, the weld material 96 is activated using an electrical charge applied from the power lead 74 with the charge passing through the weld material 96 activating it. The weld material 96 physically and sealably secures the fitting 90 to the pipe 100. The electrical charge then passes into the ground lead 78. Once the power and ground leads 76 and 78 are removed from the fitting 90 and pipe 100, they are ready for hot tapping. Here again the hot tapping is carried out in the method well known in the art.

The fitting 90 can also be used without the plug 98 in place by activating the weld material 96 in the same manner as when the fitting 90 is used with the plug 98. When the fitting 90 is used without a plug 98 some of the weld material 96 will end up in the interior of the tubular portion 92. The weld material 96 that works its way into the interior of the tubular portion 92 and might affect performance will be removed during hot tapping.

The weld material 96 shown in FIGS. 5, 6 and 7 can be the same composition as any of the those discussed for the embodiment of the present invention shown in FIGS. 2, 3 and 4.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. A method of welding a metallic branch outlet fitting to a metal pipe buried beneath the earth's surface while causing reduced disturbance to the earth above the pipe, the method comprising:
    digging a vertical small cross-sectional area excavation from the earth's surface to expose a short length of the pipe;
    positioning a first metal fitting portion on a lower surface of the pipe;
    positioning a second metal fitting portion on an upper surface of the pipe in alignment with said first fitting portion, said first and second fitting portions having metallic welding material thereon adjacent said pipe surfaces and each other; and
    from the earth's surface, activating said welding material to physically, sealably and metallically securing said fitting portions to said pipe and to each other.

2. A method of attaching a branch outlet fitting to metal pipe according to claim 1, each said fitting portions comprising insulators on inner surfaces to electrically insulate said fitting portion from said pipe but not from each other, and wherein welding material provides electrical conductivity between said fitting portions and said pipe and between each other and whereby said step of actuating said welding material includes applying an electrical potential between said fitting portions and said pipe.

3. A method of attaching a branch outlet fitting to a metal pipe according to claim 1 wherein said welding material is electro-thermally combustible and said step of actuating said welding material includes igniting said material.

4. A method according to claim 1 further comprising the step of hot tapping said pipe through said fitting to provide flow communication between said pipe and said fitting.

5. A method according to claim 1, wherein said step of actuating said welding material releases a weld metal and a shielding gas.

6. A method according to claim 1, wherein said step of actuating said welding material is comprising a shielded metal arc welding process.

7. A method according to claim 1, wherein said step of actuating said welding material is comprising an exothermic brazing process.

8. A method according to claim 1, wherein said step of actuating said welding material is comprising a thermit welding process.

9. A method according to claim 1, wherein said step of actuating said welding material is comprising an electro slag welding process.

10. A method according to claim 1, wherein said step of actuating said welding material is comprising an explosive welding process.

* * * * *